United States Patent [19]

Akao

[11] Patent Number: 4,978,572
[45] Date of Patent: Dec. 18, 1990

[54] LAMINATED FILM

[75] Inventor: Mutsuo Akao, Kanagawa, Japan

[73] Assignee: Fuji Photo Film Co., Ltd., Kanagawa, Japan

[21] Appl. No.: 464,663

[22] Filed: Jan. 11, 1990

Related U.S. Application Data

[63] Continuation of Ser. No. 253,585, Oct. 5, 1988, abandoned.

[30] Foreign Application Priority Data

Oct. 5, 1987 [JP] Japan .................................. 62-249890

[51] Int. Cl.⁵ .......................... B32B 5/16; B32B 15/08
[52] U.S. Cl. ..................................... 428/323; 428/324; 428/329; 428/330; 428/336; 428/458; 428/461; 428/476.1
[58] Field of Search ...................... 428/458, 461, 476.1, 428/323, 324, 329, 336, 330, 35.1, 35.3, 35.2, 513, 516, 215, 138, 220, 910, 140; 242/68.7; 383/113

[56] References Cited

U.S. PATENT DOCUMENTS

| 4,147,291 | 4/1979 | Akao et al. ........................... 383/113 |
| 4,258,848 | 3/1981 | Akao et al. ...................... 428/461 X |
| 4,331,725 | 5/1982 | Akao .................................. 428/138 |
| 4,337,285 | 6/1982 | Akao et al. .......................... 428/35.3 |
| 4,356,224 | 10/1982 | Akao et al. ........................... 428/220 |
| 4,359,499 | 11/1982 | Akao et al. ...................... 428/461 X |
| 4,386,124 | 5/1983 | Akao .................................. 428/35.2 |
| 4,411,943 | 10/1983 | Akao .................................. 428/513 |
| 4,411,945 | 10/1983 | Akao et al. ........................... 428/461 |
| 4,436,809 | 3/1984 | Akao et al. ...................... 428/215 X |
| 4,452,846 | 6/1984 | Akao .............................. 428/461 X |
| 4,469,741 | 9/1984 | Akao .............................. 428/910 X |
| 4,513,050 | 4/1985 | Akao .................................. 428/463 |
| 4,565,733 | 1/1986 | Akao .............................. 428/910 X |
| 4,565,743 | 1/1986 | Akao .................................. 428/35.1 |
| 4,576,865 | 3/1986 | Akao .............................. 428/516 X |
| 4,579,781 | 4/1986 | Akao .................................. 428/461 |
| 4,584,234 | 4/1986 | Hirose et al. .................... 428/516 X |
| 4,587,175 | 5/1986 | Akao .............................. 428/140 X |
| 4,629,640 | 12/1986 | Akao .............................. 428/461 X |
| 4,639,386 | 1/1987 | Akao .................................. 428/34.1 |
| 4,653,640 | 3/1987 | Akao .................................. 428/461 |
| 4,661,395 | 4/1987 | Akao .............................. 428/461 X |
| 4,661,401 | 4/1987 | Akao .............................. 428/516 X |
| 4,663,218 | 5/1987 | Akao .............................. 428/461 X |
| 4,687,692 | 8/1987 | Akao .............................. 428/220 X |
| 4,708,896 | 11/1987 | Akao .............................. 428/516 X |
| 4,730,778 | 3/1988 | Akao et al. ........................ 242/68.7 |
| 4,778,712 | 10/1988 | Akao .............................. 428/461 X |

Primary Examiner—Thomas J. Herbert
Attorney, Agent, or Firm—Burns, Doane, Swecker & Mathis

[57] ABSTRACT

A laminated film which comprises an uniaxially molecular oriented thermoplastic resin film layer containing 0.3 to 30 wt. % of white inorganic particles having a mean particle size of 0.01 to 50 μm, an ethylene copolymer resin film layer containing more than 10 wt. % of ethylene copolymer resin, a substance having antiblocking action and an antioxidant and having a melting point of lower than said uniaxially molecular oriented thermoplastic resin film layer, and a metallized thermoplastic resin film layer interposed between said uniaxially molecular oriented thermoplastic resin film layer and said ethylene copolymer resin film layer.

The laminated film of the invention hardly curls, and it is excellent in tear strength and heat sealing properties. Moreover, when the package is severely shaken during transportation, moistureproofness and lint-free ability can be still secured. Besides, the uniaxially molecular oriented thermoplastic resin film layer is made a pearl-like color bringing a favorable appearance, and is excellent in color printability other than white silver colors.

7 Claims, 1 Drawing Sheet

FIG. I 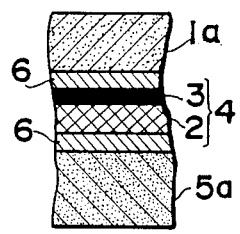

LAMINATED FILM

This application is a continuation of application Ser. No. 253,585, filed Oct. 5, 1988 now abandoned.

BACKGROUND OF THE INVENTION

1. Field of the Invention

This invention relates to a laminated film suitable for photosensitive materials, particularly for photographic photosensitive materials.

2. Description of the Prior Art

Various types of laminated films used for packaging materials for photosensitive materials have been put to practical use, and various properties are required according to their uses.

As a packaging material for photosensitive materials which lose the value by exposing them to light, laminated films capable of shielding light completely are used. The properties required are packaging material suitability, light-shielding, gas barrier, moistureproofness, antistatic property, rigidity, physical strength such as breaking strength, tear strength, impact puncture strength, Gelbo test strength and wear resistance, heat sealing properties such as heat seal strength, hot tack properties (hot-seal ability) and seal ability of contraries, flatness, low disting characteristics slipping character and the like.

Heretofore, the packaging materials utilized are a high pressure branched low density polyethylene (LDPE) resin film blended with carbon black, a laminated film composed of a LDPE resin film, a paper and an aluminum foil. The laminated film was, as shown in FIG. 8, composed of a LDPE resin film layer 12a containing a light-shielding material, an aluminum foil 11 and a bleached kraft paper 10 each through an adhesive layer 6.

Besides, the inventor has already developed a laminated film composed of a cross-laminated film using uniaxially stretched high density polyethylene (HDPE) resin films excellent in physical strength and a LDPE resin film containing at least one of a light-shielding material and an antistatic agent laminated thereon, as a packaging material, particularly a sealed lightproof bag, for a roll of a photographic photosensitive material, weight sheet-shaped photosensitive materials of more than 1 kg (U.S. Pat. No. 4,147,291, Japanese Utility Model KOKOKU No. 56-19087). Another packaging material developed by the inventor has an inexpensive cross-laminated film improved in heat sealing properties and light-shielding ability U.S. Pat. No. 4,258,848, Japanese Utility Model KOKOKU No. 61-20590. Another packaging material developed by the inventor is a laminated film having a linear low density polyethylene (L-LDPE) resin layer containing carbon black being excellent in physical strength, such as tear strength and impact puncture strength, and heat sealing properties and inexpensive (U.S. Pat. No. 4,452,846, Japanese Patent KOKAI No. 58-132555). As a packaging material using a metallized film layer, the inventor has developed a packaging material composed of a metallized film layer and two L-LDPE resin polymer layers containing more than 50 wt.% of L-LDPE resin disposed on both sides of the metallized film layer (U.S. Pat. No. 4,663,218). Either or both of the L-LDPE resin polymer layers contains 0.3 to 30 wt. % of a light-shielding material.

On the other hand, the laminated films for packaging foods widely used are light packaging bags composed of an aluminum vacuum-metallized biaxially stretched film coated with a hot melt adhesive layer or the like as the heat sealing layer used mainly for snacks.

In the aforementioned conventional laminated film having a LDPE resin film, physical strength particularly tear strength is weak, even though the thickness is thick, and curling is great. Moreover, heat sealing properties are inferior, and it is expensive. As a result, during packaging works and transportation, various problems occur such as dusting, puncture, torn and the separation of heat sealed portion.

The packaging material having a cross-laminated film disclosed in U.S. Pat. No. 4,147,291, U.S. Pat. No. 4,258,848 are excellent as the packaging material for weight materials because physical strength such as tear strength and tensile is remarkably improved. Therefore, this packaging material was put to practical use up to recently. However, since an uniaxially stretched HDPE resin film is used as the heat sealing layer, heat sealing properties are inferior. Curling or variation in physical strength occurred caused by the unevenness of the thickness of the adhesive layer or of the draw ratio of the uniaxially stretched HDPE resin film. Therefore, the package was occasionally separated or punctured. In addition, since two kinds of film molding machines are necessary to the production of the cross-laminated film where a longitudinally uniaxially stretched film and a laterally uniaxially stretched film are laminated so as to cross each other, this laminated film is expensive.

Since the packaging materials having a light-shielding L-LDPE resin film layer disclosed in U.S. Pat. 4,452,846 or Japanese Patent KOKAI No. 58-132555 are inexpensive and excellent in heat sealing properties and physical strength such as tear strength and impact puncture strength, they are excellent as the packaging material for photosensitive materials. However, in the case of packaging a weight photosensitive material or a photosensitive material having sharp edges, the light-shielding L-LDPE resin films were occasionally elongated and made thin due to their low Young's modulus, though they were not punctured nor torn. In this case, light-shielding and moistureproofness cannot be secured sufficiently.

The packaging material disclosed in U.S. Pat. No. 4,663,218 is improved in physical strength such as tear strength. However, when only one of the L-LDPE resin polymer layers contained a light-shielding material, the curling of the packaging material was great. When the melting points of the L-LDPE resin polymer layers were almost the same as each other, the outside layer was melted at the time of heat sealing, unless the heat sealer was provided with a special processing. As a result, not only pinholes and the degradation of physical strength occur, but also appearance became worse. Therefore, they were put to practical use as a laminated film, laminated to a high Young's modulus heat-resistant film such a aluminum vacuum metallized nylon or polyester film. However, the curling of the laminated film was great, and moreover, the above nylon film and polyester film were expensive.

As to the laminated film for packaging snacks, the gloss was too much, and the physical strength was weak. The curling was great, and the heat seal strength was small.

SUMMARY OF THE INVENTION

An object of the invention is to provide a laminated film excellent in appearance, physical strength, such as tear strength, tensile strength, bursting strength and impact puncture strength, heat sealing properties, such as heat resistance of outer layer, heat seal strength, heat seal tolerance, hot tack properties, sealability of contraries, elapsed heat seal strength and heat sealability in low temperature, moistureproofness and gas barrier.

Another object of the invention is to provide a laminated film hardly or not curled.

Another object of the invention is to provide a laminated film being agreeable to the touch and inexpensive.

The present invention provides a laminated film which has been achieved such objects.

Such a laminated film comprises, an uniaxially molecular oriented thermoplastic resin film layer containing 0.3 to 30 wt. % of white inorganic particles having a mean particle size of 0.01 to 50 μm, an ethylene copolymer resin film layer containing more than 10 wt. % of ethylene copolymer resin, a substance having antiblocking action and an antioxidant and having a melting point of lower than said uniaxially molecular oriented thermoplastic resin film layer, and a metallized thermoplastic resin film layer interposed between said uniaxially molecular oriented thermoplastic resin film layer and said ethylene copolymer resin film layer.

BRIEF DESCRIPTION OF THE DRAWINGS

FIGS. 1 to 5 are partially sectional views of the laminated film embodying the invention.

DETAILED DESCRIPTION OF THE INVENTION

Figure 2:
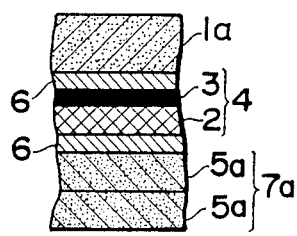

The representative uniaxially molecular oriented films are uniaxially stretched films, and however, the uniaxially molecular oriented film may also be prepared by using an apparatus of enforcing to orient molecules in an uniaxial direction. In a suitable uniaxially molecular oriented film, the tear strength in the direction of molecular orientation axis is twice or more stronger than the tear strength in the direction perpendicular to the molecular orientation axis. The uniaxially stretched films having a draw ratio of two times or more are particularly preferable. Unstretched single layer or multilayer inflation films having special resin compositions are usable as inexpensive raw materials of the uniaxially molecular oriented film. The direction of molecular orientation axis may be lateral direction, longitudinal direction or oblique direction. Suitable thermoplastic resins for composing the uniaxially molecular oriented film are polyolefin resins, polyester resins, polyamide resins, polystyrene resins, polyvinyl chloride resins, polycarbonate resins, and the like. A preferable uniaxially molecular oriented film is a laterally or obliquely uniaxially molecular oriented HDPE resin film having a thickness of more than 7 μm. A suitable thickness of the uniaxially molecular oriented film layer is in the range of 10 to 70 μm. Suitable commercial films include "Caralyan Film" (Toyo Chemical Co., l.td.) being a laterally uniaxially molecular oriented film ad "KM Film" (Mitsui Petrochemical Industries Co., Ltd.) being a obliquely uniaxially molecular oriented film. As the manufacturing method of a laterally uniaxially molecular oriented film, there are tentering method, inflation method, and the like, and the film prepared by any method is applicable to the packaging material of the invention. On the other hand, representative manufacturing methods of a obliquely uniaxially molecular oriented film are disclosed in Japanese Patent KOKAI Nos. 47-34656, 48-100464, 59-127725 and 59-122726, Japanese Patent KOKOKU Nos. 40-5319, 47-38621, 47-39927 and 53-18072, U.S. Pat. No. 3,322,613 and the like. However, the manufacturing method of the film used for the packaging material of the invention is not limited to the above methods.

The uniaxially molecular oriented thermoplastic resin film layer contains 0.3 to 30 wt. % of white inorganic particles having a mean particle size of 0.01 to 50 μm. The white inorganic particles includes titanium oxide, clay, mica, alumina, calcium silicate, aluminum hydroxide, calcium carbonate, barium sulfate, and the like ("Plastic Data Handbook", Kogyo Chosa-kai, 1980).

In the case that the mean particle size of the white inorganic particles is less than 0.01 μm, dispersibility is worse, and the particles are liable to aggregate to produce nonuniform lumps. While, when the particle size is beyond 50 μm, shielding ability is degraded, and the physical strength of the film lowers. The content of the white inorganic particles is less than 0.3 wt. %, shielding ability and mat property of surface are insufficient. Molding troubles become conspicuous, and appearance is degraded. While, when the content is beyond 30 wt. %, the physical strength of film is lowered, and the particles come off the film by shaking or rubbing. A coupling agent and a higher fatty acid or a higher fatty acid compound is preferably added in order to improve the dispersibility of the white inorganic particles. Particularly, surface-treated white inorganic particles are preferable because they are excellent in dispersibility.

The ethylene copolymer resin film layer contains ethylene copolymer resin, a substance having antiblocking action and an antioxidant.

The ethylene copolymer resin may be selected from L-LDPE resin, ethylene-vinyl acetate copolymer (EVA) resin, ethylene-ethylacrylate copolymer (EEA) resin, ethylene-methylacrylate copolymer (EMA) resin, ethylene-acrylic acid copolymer (EAA) resin, monomer resin and the like. L-LDPE resin is preferable in view of tear strength, impact puncture strength and the like.

The L-LDPE resin is a copolymer of ethylene and α-olefin and it has a linear structure having short branches. The number of carbon atoms of the α-olefin is 3-13, preferably 4 10, more preferably 6-8, and examples are butene-1, 4-methylpentene-1, hexene-1, heptene-1 and octene-1. Preferable α-olefins are 4-methylpentene-1, hexene-1, heptene-1 and octene-1. Suitable ethylene content of L-LDPE is 85-99.5 mol. %, i.e. α-olefin content is 0.5 15 mol. %, and preferable ethylene content is 90-99.5 mol. %, i.e. α-olefin content is 0.5-10 mol. %. The density is usually in the range of 0.87-0.95 g/cm3, preferably 0.88-0.93 g/cm3 (ASTM D-1505), and melt index (M.I) is preferably 0.8-30 g/10 minutes, preferably 1-7 g/10 minutes (ASTM D-1238). Such a L-LDPE resin is manufactured by solution method, slurry method, vapor phase method, or modified high pressure method. Examples of L-LDPE resin are "G-RESIN", "NUC FLX" and "TUFLIN (trade name, UCC), "NUC Polyethylene-LL" and "TUF-THENE" (Nippon Unicar Co., Ltd.), "DOWLEX"

(trade name, Dow Chemical Co., Ltd.), "STAMILEX" (trade name, DSM), "MORETEC" (Idemitsu Petrochemical Co., Ltd.), "SUCLEAR" (trade name, Dupont de Nemour, Canada), "MARLEX" (trade name, Phillips Co., Ltd.), "ULTZEX" and "NEOZEX" (trade name, Mitsui Petroleum Chemical Industries Co., Ltd.) and "NISSEKI LINIREX" (trade name, Nippon Petrochemicals Co., Ltd.).

The content of the ethylene copolymer resin in this film layer in more than 10 wt. %. When the content is less than 10 wt. %, physical strength is insufficient and heat sealing properties, particularly hot tack properties and sealability of contraries, are inferior. Particularly, in the case of adding a light-shielding material or an antiblocking agent, tear strength sharply lowers, and the practicability is lost. A preferable content of the ethylene copolymer resin is more than 20 wt. %, more preferably more than 50 wt. %. The upper limit of the content is 99.9 wt. % or less, and it varies according to the kind of the ethylene copolymer resin, the substance having antiblocking action, the antioxidant and the like.

Two or more kinds of the ethylene copolymer resins may be combined, and other resin(s) may be blended with the ethylene copolymer resin. Suitable resins for blending include LDPE resin, MDPE resin, HDPE resin, homopolypropylene resin, propylene- -olefin random copolymer resin, modified ethylene copolymer resin, modified polyethylene resin, modified polypropylene resin, polyamide resin, polyester resin, synthetic rubber, saponified ethylene-vinyl acetate copolymer resin, elastomer, etc.

The substance having antiblocking action is not limited to an antiblocking agent, and includes a light-shielding material, lubricant and the like exhibiting antiblocking action in the blended state. For example, when HDPE resin is blended, antiblocking effect is great. Blocking can be prevented by blending more than 5 wt. % of HDPE resin having a density of more than 0.940 g/cm$^3$.

The antiblocking agent includes silica, diatomaceous earth, calcium silicate, aluminum silicate, magnesium silicate, calcium carbonate, talc, higher fatty acids, polyvinyl esters, n-octadecyl urea, dicarboxylic acid ester amides, N,N'-dioleylhydroxamide, and the like.

The light-shielding material exhibiting antiblocking action in the blended state includes various carbon blacks, graphite, iron oxide, zinc white, titanium oxide, clay, aluminum powder, aluminum paste, calcium carbonate, mica, barium sulfate, talc, cadmium pigments, red iron oxide, cobalt blue, copper-phthalocyanine pigments and aniline black. Among these, a preferable light-shielding material is carbon black, and a particularly preferable substance is oil furnace carbon black having a pH of 5 to 9 and a mean particle size of 10 to 120 $\mu$m, particularly having a pH of 6 to 9 and a mean particle size of less than 80 m$\mu$. By using the carbon black of such pH and particle size, a packaging material having the following merits is obtained. That is, the occurrence of fogging is rare, increase or decrease of photosensitivity scarcely happens, light-shielding ability is great, the lumps of carbon black and pinholes such as fish eyes hardly occur, and physical strength and heat sealing properties are improved. There are various methods for blending a light-shielding material, the masterbatch is preferable in view of cost, not staining working place, etc.

As the preferable light-shielding material, metal powder is in the second place. Metal powder is a light-reflective light-shielding material. It imparts silver appearance being preferable, and it is excellent in moistureproofness, light-shielding, antistatic property, thermal shielding in the sunlight and gas barrier. As the metal powder, aluminum powder and its paste are preferable. The paste of aluminum powder is produced by adding mineral spirit and a small amount of a higher fatty acid such as stearic acid or oleic acid to form paste at the production of aluminum powder according to a known method such as using a ball mill, a stamp mill or an atomizer. A polyolefin thermoplastic resin, such as verious polypropylene resins, various polyethylene resins, EVA resin, EEA resin and EAA resin, etc. is kneaded together with this aluminum paste under heating, and volatile components mainly mineral spirit are removed by a vacuum pump. This product is used as aluminum paste compound resin or aluminum paste masterbatch resin. The aluminum paste masterbatch resin is preferable because of eliminating bad smell and adverse influence upon the photographic photosensitive materials. In order to eliminate bad smell and adverse influence upon the photographic photosensitive materials, the content of mineral spirit should be less than 0.1 wt. %. When the aluminum paste content of coextruded double layer film is made 2 wt. % by using a masterbatch resin containing 40 wt.% of aluminum paste and 1.0 wt. % of mineral spirit, one part by weight of the masterbatch resin is blended with 19 parts by weight of the main resin. Since a part of mineral spirit evaporates during molding, the final content of the mineral spirit is less than 0.05 wt. %. The aluminum powder includes microflakes produced from aluminum foil which is crushed by a ball mill or a stamp mill, in addition to usual aluminum powder manufactured by atomization, dropping on a rotary disc or evaporation from melted aluminum. Since aluminum powder is unstable, it is stabilized by a known treatment. A most representative treatment is that the surface of aluminum powder is coated with a higher fatty acid to form the aluminum salt. The lubricant includes:

Oleic acid amide lubricants; "ARMOSLIP-CP" (Lion akzo Co., Ltd.), "NEWTRON" and "NEWTRON E-18" (Nippon Fine Chemical Co., Ltd.), "AMIDE-0" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), "NEWTRON S" (Nippon Fine Chemical Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; Dimethylpolysiloxanes, etc. (Sinetsu Chemical Co., Ltd., Toray Silicone Co., Ltd.), etc.

Alkylamine lubricants; "ELECTROSTRIPPER TS-2" (Kao Corp.) etc.

Preferable lubricants include the fatty acid amide lubricants having a number of carbon atoms of 8 to 50, preferably 15 to 35. Two or more lubricants may be combined.

A suitable content of the substance having antiblocking action is, 0.01 to 5 wt. % in the case of the antiblocking agent, 0.5 to 10 wt. % in the case of the light-shielding material, and 0.01 to 2 wt. % in the case of the fatty acid amide lubricants, when it is used for the package of photographic photosensitive materials. While, in the case of the lubricant to impart relatively low slipperiness, such as metal salts of fatty acids, hydrocarbon compounds, fatty acids and fatty acid amides, a suitable content is 0.05 to 5 wt. %.

Suitable antioxidants are phenol antioxidants, sulfur-containing antioxidants, phosphorus-containing antioxidants and the like. The phenol antioxidants include n-octadecyl-3-(3',5'-di-t-butyl-4'-hydroxyphenyl)propionate, 2,6-di-t-butyl-4-methylphenol, 2,6-di-t-butyl-p-cresol (BHT), 2,2'-methylenebis(4-methyl-6-t-butylphenol), 4,4'-thiobis(3 methyl-6-t-butylphenol), 4,4'-butylidenebis(3-methyl-6-t-butylphenol), stearyl-B(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene, octadecyl-3-(3,5-di-t-butyl-4-hydroxyphenyl) propionate and tetrakis methylene-3(3',5'-di-t-butyl-4'-hydroxyphenyl)propionate methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite. Particularly effective antioxidats are BHT, low volatile high molecular weight phenol antioxidants ("Irganox 1010", "Irganox 1076", trade names of Ciba-Geigy A.C., "Topanol CA", trade name of I.C.I., etc.), dilaurylthiodipropionate, distearylthiodipropionate, dialkylphospate, etc. Particularly preferable antioxidants are phenol antioxidants. Two or more antioxidants may be combined. A suitable content of the antioxidant is in the range not adversely affecting photosensitive materials, i.e. 0.001 to 1 wt. %, irrespective of the case of single antioxidant or the case of a combination of two or more antioxidants. When the content is less than 0.001 wt. %, the blending effect hardly appears. While, when the content is beyond 1 wt. %, photographic film utilizing oxidation-reduction reaction is adversely influenced by antioxidant. In order to avoid the adverse influence, the content of antioxidant is a minimum amount capable of preventing coloring troubles and generation of lumps. When antioxidant is combined with carbon black, oxidation inhibition effect synergistically appears. To each layer of the packaging material of the invention, necessary amounts of various additives may be added according to required properties. Particularly, to add various antistatic agents and conductive materials are preferable in view of improving antistatic properties. Preferable antistatic agents are cationic antistatic agents and nonionic antistatic agents, and a suitable content is 0.01 to 2 wt. %.

The resin of the ethylene copolymer resin film layer is selected so that the melting point (ASTM DZ117) becomes lower than the uniaxially molecular oriented thermoplastic resin film layer, preferably by 125° C. or further lower. By this relation, the tolerance of the heat sealing temperature is extended, and pinhole and marring of appearance is prevented by lowering heat sealing temperature.

The thickness of the ethylene copolymer resin film layer is usually in the range of 15 to 120 μm. The ethylene copolymer resin film layer may be in a form of a coextruded multilayer film composed of the ethylene copolymer resin film layers alone or a combination of the ethylene copolymer resin film layer(s) and other thermoplastic resin film layer(s).

The metallized thermoplastic resin film layer is composed of polyolefin resin, preferably polypropylene resin, polyethylene resin, polybutene resin or a mixture thereof, polyester resin, polyamide resin, polycarbonate resin or polystyrene resin, as the principal component. The metallic membrane layer may be formed of a pure metal such as Al, Sn, Zn, Co, Cr, Ni, Fe, Cu, etc., alloys thereof, or any other metals of which metallic membrane layer can be made, but aluminum is the most preferable in terms of processing and cost. An aluminum vacuum metallized biaxially stretched nylon film is a most suitable because of having a high Young's modulus and decreasing pinhole generation. A suitable thickness of the metallic membrane layer is 55 to 1,200 Å in view of physical strength, light-shielding ability, antistatic property, moistureproofness, cost and the like. In the case of aluminum-metallized membrane, preferable thickness is thicker than 70Å, more preferably 80 to 800Å, further more preferably 100 to 600Å. Metallization is carried out according to a known method, such as vacuum evaporation, sputtering, ion plating, or electron beam heating. A suitable thickness of the metallized thermoplastic resin film layer is 7 to 50 μm.

The metallized thermoplastic resin film layer is interposed between the uniaxially molecular oriented thermoplastic resin film: layer and the ethylene copolymer resin film layer.

The respective layers mentioned previously may be laminated according to a known method such as a heat sealing (hot bar sealing, Verneuil's method, impulse heat sealing, supersonic heat sealing, etc.) or the method using an adhesive (wet laminating, dry laminating, hot melt laminating, extrusion laminating, etc.).

The adhesive is selected by considering both layers to be joined, and includes thermoplastic resin melting adhesives including a polyolefin adhesive, hot melting type adhesive, gum adhesives and solution type adhesives. The polyolefin adhesives include a homopolymer and a copolymer of an olefin such as various polyethylenes, polypropylenes, polybutenes and ethylene-propylene copolymers and ethylene-(α-olefin copolymer (L LDPE), a copolymer of an olefin and another monomer such as ethylene-vinyl acetate copolymer, ethylene-acrylate ester copolymer, modified ethylene copolymer resin, modified polyethylene resin, modified polypropylene resin, various ionomers (ionic copolymer resins, "SURLYN" Dupont, "HIMIRAN" Mitsui Polychemicals Co., Ltd., etc.), adhesive polymer ("ADOMER", Mitsui Polychemicals Co., Ltd, "MODIC", Mitsubishi Petrochemical Co., Ltd.) and a graft copolymer. The solution type adhesives are divided into adhesives for wet lamination and adhesives for dry lamination. The adhesives for wet lamination are emulsion-type adhesives or latex-type adhesives. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex type adhesives are natural rubber latex, styrene-butadiene rubber latex, acrylonitrile-butadiene rubber latex and chloroprene rubber latex. An example of the adhesives for dry lamination is polyurethane adhesive vinyl resin adhesives, acrylic resin adhesives, polyamide resin adhesives, epoxy resin adhesives, rubber adhesives and the like. Adhesives for hot melt lamination containing paraffin wax, microcrystalline wax, ethylene-vinyl acetate copolymer and ethylene-ethylacrylate copolymer, pressure-sensitive adhesives, temperature-sensitive adhesives and ultraviolet curing type adhesives may also be employed. Particularly preferable extrusion laminating adhesives are LDPE resin and L-LDPE resin due to their excellent laminating ability and inexpensiveness. Besides, the blend resin of the foregoing resins for adhesive so as to compensate the defect of each resin is also particularly preferable. An example; of the blended resin is a blended LDPE resin improved in extensibility by blending a high MI L-LDPE resin. The thickness of the adhesive layer formed by extrusion laminating using a thermoplastic resin is usuability 6 to 50 $\mu$m, preferably 10 to 20 $\mu$m. However, the thickness is determined based upon cost, application speed, thickness of the whole layers, and etc., and accordingly, the thickness is not limited to the above range. In the case that the resin temperature at the adhesion is set in the range of 200° to 380° C., laminating properties such as laminating ability and adhesive strength are improved, and pinholes are decreased. In view of securing physical strength, one of the aforementioned layers is preferably laminated so that the adhesive strength is less than 350 g/15 mm width.

The laminated film of the invention may be used for packaging photosensitive materials such as photographic photosensitive materials, foods, medicines or chemical substances, and it is particularly suitable for packaging silver halid photographic photosensitive materials, diazo photographic photosensitive materials, photosensitive resins, self-developing type photographic photosensitive materials, heat-developing type photosensitive materials, direct positive color photosensitive materials, diffusion transfer type photographic photosensitive materials and other photographic materials which is degraded by little amount of light or moisture or gas.

Package form may be usual, and includes a single-sheet flat bag, a double-sheet flat bag, a self-standing bag, a single-sheet gusset bag, a double-sheet gusset bag, inner lining for a moistureproof box, inner lining for a light room-loading light-shielding box and a leader paper etc. The sealing form may also be usual, and includes heat sealing, side welding, impulse heat sealing, ultrasonic sealing and high frequency sealing etc. The methods of using an adhesive may also be utilized.

In the laminated film of the invention, the combination of the uniaxially molecular oriented thermoplastic resin film layer containing of white inorganic particles and the metallized thermoplastic resin film layer gives the appearance of a pearl color. The pearl color conceals the pressure marks and abrasions, it prevent the temperature elevation, when it is left under the sunlight. Moreover, the above combination prevents curling, and improves printability. The metallized thermoplastic resin film layer improves moistureproofness, gas barrier and antistatic property. The ethylene copolymer resin film layer improves heat sealing properties and physical strength such as tear strength, impact puncture strength and dropping strength.

Thus, the laminated film of the invention hardly curls, and it is excellent in tear strength and heat sealing properties. Moreover, when the package is severely shaken during transportation, moistureproofness and lint-free ability can be still secured. Besides, the uniaxially molecular oriented thermoplastic resin film layer is made a pearl-like color bringing a favorable appearance, and is excellent in color printability other than white silver colors.

Representative embodiments of the laminated film of the invention are illustrated in FIGS. 1 to 5.

The laminated film of FIG. 1 is composed of the uniaxially molecular oriented thermoplastic resin film layer 1a, the metallized thermoplastic resin film layer 4 consisting of a thermoplastic resin film layer 2 and a metal membrane layer 3, and the ethylene copolymer resin film layer 5a containing a light-shielding material laminated in this order each through an adhesive layer 6.

The laminated film of FIG. 2 is the same as the laminated film of FIG. 1, except that the ethylene copolymer resin film layer 5a is replaced by a coextruded multilayer film layer 7a consisting of two ethylene copolymer resin film layers 5a, 5a containing a light-shielding material.

Figure 3:
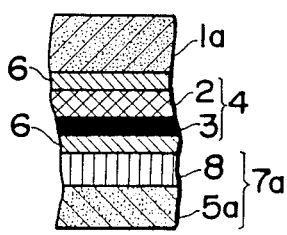

The laminated film of FIG. 3 is composed of the uniaxially molecular oriented thermoplastic resin film layer 1a containing a light-shielding material, the metallized thermoplastic resin film layer 4 where the metal membrane layer 3 is disposed on the opposite side to the case of the laminated film of FIG. 1 and a coextruded multilayer film layer 7a consisting of a thermoplastic resin film layer 8 not containing ethylene copolymer resin and the ethylene copolymer resin film layer 5a containing a light-shielding material laminated in this order each through an adhesive layer 6.

Figure 4:
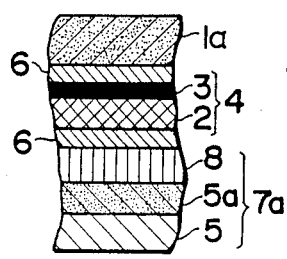

The laminated film of FIG. 4 is the same as the laminated film of FIG. 1, except that the ethylene copolymer resin film layer 5a is replaced by a coextruded multilayer film layer 7a consisting of a thermoplastic resin film layer 8 not containing ethylene copolymer resin, the ethylene copolymer resin film layer 5a containing a light-shielding material and the ethylene copolymer resin film layer 5 not containing a light-shielding material.

Figure 5:
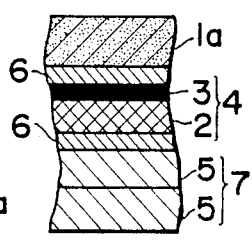

The laminated film; of FIG. 5 is the same as the laminated film of FIG. 2, except that neither of the two ethylene copolymer resin film layers 5,5 contains a light-shielding material.

Figure 6:
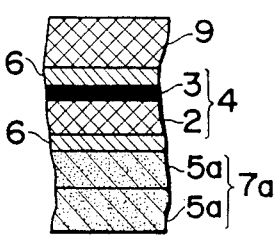
FIGS. 6 and 7 are partially sectional views of comparative laminated films.
Figure 7:
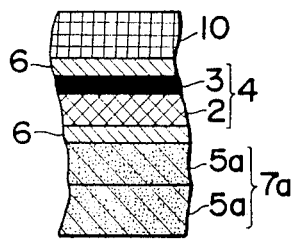

Two comparative laminated films are illustrated in FIGS. 6 and 7.

The comparative laminated film of FIG. 6 is the same as the laminated film of FIG. 2, except that a biaxially stretched thermoplastic resin film layer 9 is laminated instead of the uniaxially molecular oriented thermoplastic resin film layer 1a.

The comparative packaging material of FIG. 7 is the same as the packaging material of FIG. 2, except that a bleached kraft paper 10 is laminated instead of the uniaxially molecular oriented thermoplastic resin film layer 1a.

EXAMPLES

The laminated film of Example I corresponds to the laminated film of FIG. 2. The uniaxially molecular oriented thermoplastic resin film layer 1a was a laterally uniaxially stretched HDPE resin film layer 18 um thick containing 3 wt. % of titanium dioxide and 1 wt. % of calcium carbonate. The metallized thermoplastic resin film layer 4 was an aluminum vacuum-metallized biaxially stretched nylon film layer consisting of a biaxially stretched nylon film layer 2 having a thickness of 15 μm and an aluminum membrane layer 3 having a thickness of 400 Å. The ethylene copolymer resin film layer 5a disposed on the adhesive layer 6 side was a L-LDPE resin film layer 30 μm thick composed of 76.9 wt. % of L-LDPE resin being ethylene and 4-methylpentene-1 copolymer resin having a MI of 2.1 g/10 minutes and a density of 0.920 g/cm$^3$, 20 wt. % of HDPE resin having a MI of 1.1 g/10 minutes and a density of 0.954 g/cm$^3$, 3 wt. % of oil furnace carbon black having a mean particle size of 21 mμ and 0.1 wt. % of a phenol antioxidant. The other ethylene copolymer resin film layer 5a disposed as the surface layer was a L-LDPE resin film layer 40 μm thick composed of 96.8 wt. % of L-LDPE resin being ethylene and 4-methylpentene-1 copolymer resin having a MI of 2.1 g/10 minutes and a density of 0.920 g/cm$^3$, 3 wt. % of oil furnace carbon black having a mean particle size of 21 μm, 0.1 wt. % of a phenol antioxidant, 0.05 wt. % of a phosphorus-containing antioxidant and 0.05 wt. % of oleic acid amide lubricant. The two ethylene copolymer resin film layers 5a, 5a were coextruded by a double layer coextruding inflation molding process. Each adhesive layer 6 was an extrusion laminating adhesive layer 13 μm thick composed of LDPE resin having a MI of 5.1 g/10 minutes and a density of 0.919 g/cm$^3$.

The laminated film of Example II also corresponds to the laminated film of FIG. 2. Respective layers were the same as the laminated film of Example I, except that the laterally uniaxially stretched HDPE resin film was replaced by a obliquely uniaxially molecular oriented HDPE resin film 50 μm thick containing 6 wt. % of titanium dioxide manufactured by the equipment described in Japanese Patent KOKOKU No. 53-38306.

Comparative laminated film, I corresponds to the laminated film of FIG. 6. Respective layers were the same as the laminated film of Example I, except that a biaxially stretched polyester resin film 25 μm thick was used as the biaxially stretched thermoplastic resin film layer 9.

Comparative laminated film II corresponds to the laminated film of FIG. 6. Respective layers were the same as the laminated film of Example I, except that a biaxially stretched polypropylene resin film 20 μm thick was used as the biaxially stretched thermoplastic resin film layer 9.

Comparative laminated film III was the same as the laminated film of Example I, except that the uniaxially molecular oriented thermoplastic resin film layer 1a was replaced by a cross laminated film of two obliquely uniaxially stretched HDPE resin film 45 μm thick containing 3 wt. % of carbon black laminated through a LDPE resin extrusion laminating adhesive layer so that the molecular orientation axes cross each other at 90 degrees.

Figure 8:
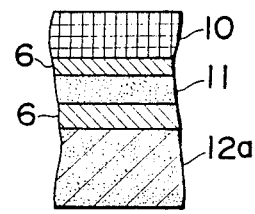
FIGS. 8 is a partially sectional view of a conventional laminated film.

Conventional laminated film I corresponds to the laminated film of FIG. 8. The bleached kraft paper layer 10 had an areal weight of 35 g/m$^2$, and the aluminum foil layer 11 had a thickness of 7 μm. The LDPE resin film layer 12a was composed of 97 wt. % of LDPE resin having a MI of 2.4 g/10 minutes and a density of 0.923 g/cm$^3$ and 3 wt. % of oil furnace carbon black having a mean particle size of 21 mμ manufactured by inflation process in a thickness of 70 μm. Each adhesive layer 6 was an extrusion laminating adhesive layer 40 μm thick and had the same resin composition as in Example I.

The layer compositions of the above packaging materials are compared in brief in Table 1. Various properties of the above films were measured, and the results are summarized in Table 2.

TABLE 1

| | Invention | | Comparative | | | Conventional |
| --- | --- | --- | --- | --- | --- | --- |
| | I | II | I | II | III | I |
| Layer Composition | FIG. 2 | FIG. 2 | FIG. 6 | FIG. 7 | — | FIG. 8 |
| Outer Layer | Lateral HDPE*[1] (18 μm) 3 wt. % TiO$_2$ 1 wt. % CaCO$_3$ | Oblique HDPE*[2] (50 μm) 6 wt. % TiO$_2$ | Biaxial Polyester*[3] (25 μm) | Biaxial PP*[4] | Cross Laminated*[5] (100 μm) | Kraft Paper*[6] (35 g/m$^2$) |
| Adhesive Layer | LDPE*[7] (13 μm) | Oblique HDPE*[2] (50 μm) 6 wt. % TiO$_2$ | Biaxial Polyester*[3] (25 μm) | Biaxial PP*[4] | Cross Laminated*[5] (100 μm) | LDPE*[7] (40 μm) |
| Intermediate Layer | Al-Biaxial Nylon*[8] (15 μm) | Oblique HDPE*[2] (50 μm) 6 wt. % TiO$_2$ | Biaxial Polyester*[3] (25 μm) | Biaxial PP*[4] | Cross Laminated*[5] (100 μm) | Al Foil (7 μm) |
| Adhesive Layer | LDPE*[7] (13 μm) | Oblique HDPE*[2] (50 μm) 6 wt. % TiO$_2$ | Biaxial Polyester*[3] (25 μm) | Biaxial PP*[4] | Cross Laminated*[5] (100 μm) | LDPE*[7] (40 μm) |
| Inner Layer | Double CB-Contg. L-LDPE Layer*[9] (70 μm) | Oblique HDPE*[2] (50 μm) 6 wt. % TiO$_2$ | Biaxial Polyester*[3] (25 μm) | Biaxial PP*[4] | Cross Laminated*[5] (100 μm) | Single CB-Contg. LDPE Layer*[10] (70 μm) |
| Total Thickness | 130 μm | 158 μm | 137 μm | 133 μm | 211 μm | 209 μm |

*[1]Laterally uniaxially stretched HDPE resin film
*[2]Obliquely uniaxially stretched HDPE resin film
*[3]Biaxially stretched polyester resin film
*[4]Biaxially stretched polypropylene resin film
*[5]Cross-laminated film
*[6]Bleached kraft paper
*[7]LDPE extrusion adhesive layer
*[8]Aluminum vacuum-metallized biaxially stretched nylon film
*[9]Coextruded double L-LDPE resin inflation film containing 3 wt. % of carbon black
*[10]Single LDPE resin inflation film containing 3 wt. % of carbon black In addition, when Comparative laminated film III was left under the sunlight, the surface temperature was elevated. The discrimination of the right side and the reverse side was difficult under the safety light (evaluated as E), and moreover, it was expensive.

TABLE 2

|  | Invention I | Invention II | Comparative I | Comparative II | Comparative III | Conventional I |
|---|---|---|---|---|---|---|
|  | A | B | E | E | E | D |
| Curling | 0.3 cm | −0.3 cm | 16.8 cm | 23.2 cm | 19.8 cm | 7.3 cm |
| Tear Strength (MD) | 413 g | 698 g | 512 g | 242 g | >1400 g | 286 g |
| Tear Strength (CD) | 478 g | 912 g | 604 g | 561 g | >1400 g | 348 g |
| Moistureproofness After Shaking | A | A | C | C | A | E |
| Lint-Free Ability After Shaking | A | A | A | A | B | E |
| Light-Shielding After Shaking | A | A | C | C | A | E |
| Dropping Strength | A | A | C | C | A | E |
| Heat Sealing Properties | A | A | A | A | C | C |
| Appearance | A (Pearl color) | A (Pearl color) | B | B | D | B |
| Concealability of Damages | A | A | D | D | C | A |
| Mat Property | B | A | D | D | C | B |

Evaluations in Table 2 were carried out as follows:
A very excellent
B excellent
C practical
D having a problem
E impractical Testing methods were as follows:

Curling: A circular test piece having 10 cm in diameter was prepared from the film to be tested. The test piece was placed on a flat plate, and allowed to stand at 20° C. at 65 % RH for 24 hours without loading. The distance l between both ends was measured, and 10 - l (cm) was used as the curling value.

Tear Strength: According to JIS P-8116

Moistureproofness After Shaking: Gusset bags were prepared from the film to be tested, and a roll of a color photographic printing paper having a size of 8.9 cm × 180 m was placed in each bag. Then, the gusset bag was heat-sealed, and four gusset bags containing the roll were placed in a corrugated board box. The vibration test was applied to the corrugated board box according to JIS Z-0232. Then, the moisture permeability test was carried out according to JIS Z-0208, and the moistureproofness of the gusset bag was estimated relatively.

Lint-Free Ability After Shaking: The dust generation degree of each gusset bag was relatively estimated after the above vibration test according to JIS Z-0232.

Light-Shielding After Shaking: After the above vibration test according to JIS Z-0232, each gusset bag was exposed to the light of 80,000 luxes for 5 hours, the light-shielding ability was estimated by the fogging degree of the color photographic printing paper after developing in a dark room.

Dropping Strength: Gusset bags were prepared from the film to be tested, and a roll of a color photographic printing paper having a size of 8.9 cm × 180 m was placed in each bag. Then, the gusset bag was heat-sealed, and four gusset bags containing the roll were placed in a corrugated board box. The corrugated box was dropped from 50 cm height, and the punctured state of the gusset bag was estimated. Heat-Sealing Properties: Judged by total heat seal properties including heat seal strength, hot tack properties, seal ability of contraries, elapsed heat seal strength and heat sealable temperature tolerance. Appearance: Judged by organoleptic test. Concealability of Damages: The concealability of molding troubles including lumps and furrows by organoleptic test.

Mat Property: The light reflection state of the surface of each laminated film was estimated by visual observation.

What is claimed is:

1. A laminated film which comprises an uniaxially molecular oriented thermoplastic resin film layer which is a laterally or obliquely uniaxially molecular oriented HDPE resin film having a thickness of more than 7 μm containing 0.3 to 30 wt. % of white inorganic particles having a mean particle size of 0.01 to 50 μm, an ethylene copolymer resin film layer containing more than 10 wt. % of ethylene copolymer resin, a substance having antiblocking action and an antioxidant and having a melting point of lower than said uniaxially molecular oriented thermoplastic resin film layer, and a metallized thermoplastic resin film layer interposed between said uniaxially molecular oriented thermoplastic resin film layer and said ethylene copolymer resin film layer.

2. The laminated film of claim 1 wherein said white inorganic particles are selected from the group consisting of titanium oxide, clay, mica, alumina, calcium silicate, aluminum hydroxide, calcium carbonate and barium sulfate.

3. The laminated film of claim 1 wherein said uniaxially molecular oriented thermoplastic resin film is an uniaxially stretched thermoplastic resin film having a draw ratio of two times or more.

4. The laminated film of claim 1 wherein said ethylene copolymer resin is L-LDPE resin.

5. The laminated film of claim 1 wherein said substance having antiblocking action is an antiblocking agent.

6. The laminated film of claim 1 wherein said substance having antiblocking action is carbon black, aluminum powder or a fatty acid amide lubricant.

7. The laminated film of claim 1 wherein said metallized thermoplastic resin film layer is aluminum vacuum metallized biaxially stretched nylon film.

* * * * *